(12) United States Patent
Scott et al.

(10) Patent No.: US 6,948,698 B1
(45) Date of Patent: Sep. 27, 2005

(54) VALVE FOR PRESSURIZED CANISTER

(76) Inventors: Eric Scott, 15695 92nd Way, N., Jupiter, FL (US) 33478; Nancy A. Scott, 15695 92nd Way, N., Jupiter, FL (US) 33478

( * ) Notice: Subject to any disclaimer, the term of this patent is extended or adjusted under 35 U.S.C. 154(b) by 0 days.

(21) Appl. No.: 10/871,793

(22) Filed: Jun. 18, 2004

(51) Int. Cl.[7] .................................................. F16L 35/00
(52) U.S. Cl. .................. 251/148; 251/149.6; 251/144; 222/3; 285/81; 285/92; 285/924; 137/68.19
(58) Field of Search ....................... 137/68.19; 285/81, 285/90, 92, 123.9, 123.13, 924; 251/144, 251/148, 152, 149.6; 222/3

(56) References Cited

U.S. PATENT DOCUMENTS

| | | | | |
|---|---|---|---|---|
| 2,943,869 A | * | 7/1960 | Nordin ......................... 285/90 |
| 3,216,466 A | * | 11/1965 | Simko ........................... 222/3 |
| 3,424,478 A | * | 1/1969 | Hutchinson ................... 285/90 |
| 3,645,286 A | * | 2/1972 | Follett ........................... 222/3 |
| 3,648,893 A | * | 3/1972 | Whiting ......................... 222/3 |
| 3,930,517 A | * | 1/1976 | Gagala .......................... 222/3 |
| 4,077,422 A | * | 3/1978 | Brinkley et al. ......... 137/68.23 |
| 4,168,015 A | * | 9/1979 | Robinette ....................... 222/3 |
| 4,763,690 A | * | 8/1988 | Martin ..................... 251/149.6 |
| 4,921,281 A | * | 5/1990 | Taylor .......................... 285/90 |
| 5,083,818 A | * | 1/1992 | Schoot ......................... 285/81 |
| 5,494,024 A | | 2/1996 | Scott ............................ 124/73 |
| 5,669,369 A | | 9/1997 | Scott ............................ 124/73 |
| 6,186,557 B1 | * | 2/2001 | Funk ............................ 285/81 |
| 6,233,928 B1 | | 5/2001 | Scott ............................ 60/407 |

* cited by examiner

*Primary Examiner*—John Rivell
(74) *Attorney, Agent, or Firm*—Banner & Witcoff, Ltd.

(57) ABSTRACT

A valve for a pressurized canister includes a housing having a central aperture extending therethrough, a first set of external threads, and a second set of external threads. A sealing member is positioned in an axially outward end of the central aperture and is axially moveable. A first spring biases the pin axially outwardly. An axially slidable member is received and axially movable in the central aperture. A second spring biases the axially slidable member outwardly. A threaded member in an aperture in the housing engages the axially slidable member. Each of a plurality of radially moveable members is positioned in an aperture in the housing and is radially moveable between a lip on the aperture and the second spring. An exterior surface of an inner end of the axially slidable member engages and forces each radially moveable member into contact with the lip when the threaded member is tightened.

25 Claims, 2 Drawing Sheets

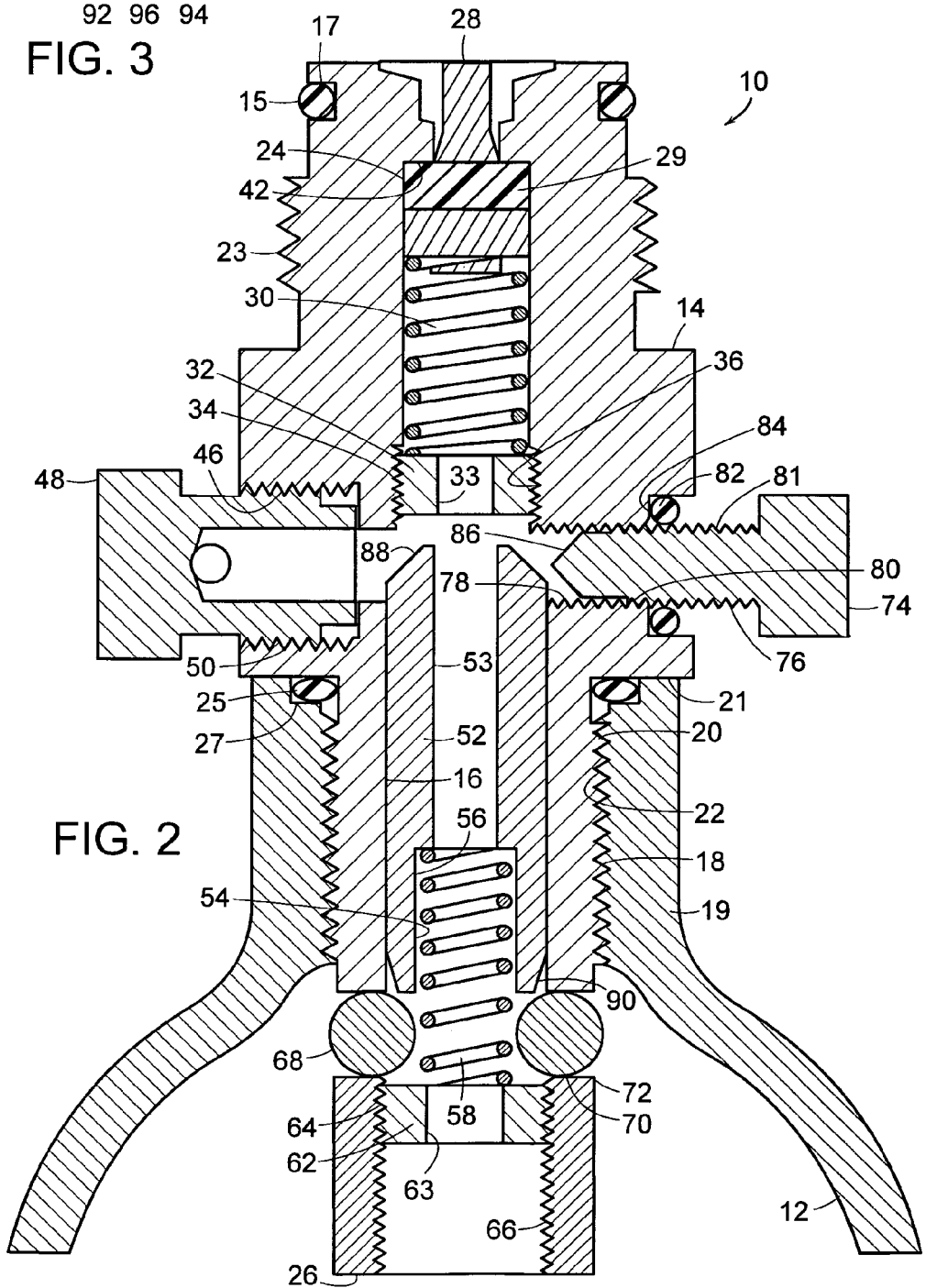

VALVE FOR PRESSURIZED CANISTER

FIELD OF THE INVENTION

This invention relates generally to a valve for a pressurized canister, and, in particular, to a valve for a pressurized canister having improved safety features.

BACKGROUND OF THE INVENTION

Canisters for containing pressurized fluids, for example, gases such as nitrogen, air and $CO_2$, are well known. These canisters typically include a valve that is threaded into an aperture formed in the canister. The valve includes a spring-loaded pin that is activated by an adapter, such as an ASA adapter, which may be attached to a regulator, on another device to release a desired amount of pressurized fluid to the device. The adapter is typically connected to the valve by way of external threads on the housing of the valve that are received by internal threads formed in an aperture in the regulator. Such canisters are used in many applications including, for example, paintball guns.

A potential safety issue is present when the canister contains pressurized fluid. It is possible for a user, when trying to remove the valve and canister from the regulator, to unscrew the valve from the canister, rather than the valve from the regulator. This may happen, for example, when thread sealant on the threads of the valve and the threads of the regulator has been inadvertently omitted or wrongly applied. If the valve is unscrewed from the canister while the canister is pressurized, the pressurized fluid can propel the tank away from the valve with great force, creating a significant safety risk.

It is an object of the present invention to provide a valve for a pressurized canister that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a valve for a pressurized canister having improved safety features.

In accordance with a first preferred embodiment, a valve for a pressurized canister includes a housing having a central aperture extending therethrough, a first set of external threads, and a second set of external threads positioned radially inwardly of the first set of external threads. A sealing member is positioned in an axially outward end of the central aperture and is axially moveable with respect to the housing to seal and unseal the central aperture. A first spring biases the sealing member axially outwardly. A axially slidable member is received in and axially movable with respect to the central aperture. A second spring resiliently biases the axially slidable member axially outwardly. A threaded member threadingly engages a radial aperture in the housing, with a radially inner end of the threaded member engageable with an axially outer end of the axially slidable member. Each of a plurality of balls is positioned in a corresponding aperture formed in the housing, with a lip being formed on an exterior of the housing about each corresponding aperture. Each ball is radially moveable with respect to the housing between the lip and the second spring. An exterior surface of an axially inner end of the axially slidable member engages and forces each ball radially outward into contact with the lip when the threaded member is in a tightened position.

In accordance with another preferred embodiment, a valve for a pressurized canister includes a substantially cylindrical housing having a central aperture extending therethrough, a first set of external threads, and a second set of external threads positioned radially inwardly of the first set of external threads. A pin is axially positioned in an axially outward end of the central aperture and is axially moveable to seal and unseal the central aperture. A first spring biases the pin axially outwardly. An axially slidable member is received in the central aperture and provides a fluid passage therethrough. A second spring resiliently biases the axially slidable member axially outwardly. A threaded member threadingly engages a radial aperture in the housing, with a radially inner end of the threaded member being beveled and engageable with an axially outer beveled end of the axially slidable member. Each of a plurality of radially moveable members is positioned in a corresponding aperture formed in the housing, with a lip being formed on an exterior of the housing about each corresponding aperture. An exterior surface of an axially inner end of the axially slidable member is engageable with the radially moveable members to move the radially moveable members between a first radially outward position in which they are in contact with the lips and a second radially inward position in which they are in contact with the second spring.

In accordance with a further preferred embodiment, a valve assembly for a pressurized canister includes a substantially cylindrical housing having a central aperture extending therethrough, a first set of external threads, and a second set of external threads positioned radially inwardly of the first set of external threads. A pin having a seal is positioned in an axially outward end of the central aperture, with the pin engageable with a shoulder formed at the end of the central aperture and axially moveable to seal and unseal the central aperture. A first spring biases the pin axially outwardly toward the shoulder of the central aperture. A pressure relief valve is positioned in an aperture formed in the housing. A sleeve is received in and axially movable with respect to the central aperture. A second spring resiliently biases the sleeve axially outwardly. A screw threadingly engages a radial aperture in the housing, with a radially inner end of the screw being beveled and engageable with an axially outer beveled end of the sleeve. The screw has a flat on its threads about a portion of its circumference. An O-ring provides a seal between a head of the screw and the housing. Each of a plurality of balls is positioned in a corresponding aperture formed in the housing, with a lip formed on an exterior of the housing about each of corresponding aperture. An exterior surface of an axially inner end of the sleeve is engageable with the balls to move the balls between a first radially outward position in which they are in contact with the lips and a second position radially inward position in which they are in contact with the second spring.

Substantial advantage is achieved by providing a valve for a pressurized canister. In particular, certain preferred embodiments of the present invention reduce the risk of the valve inadvertently being loosened from the canister while the canister is pressurized.

BRIEF DESCRIPTION OF THE DRAWINGS

FIG. 2 is a section view of the valve of FIG. 1, shown installed on a canister in a second open condition with the threaded member for the valve partially unscrewed.

FIG. 3 is a section view of an alternative embodiment of the pressure relief valve of the valve of FIG. 1.

Figure 1:
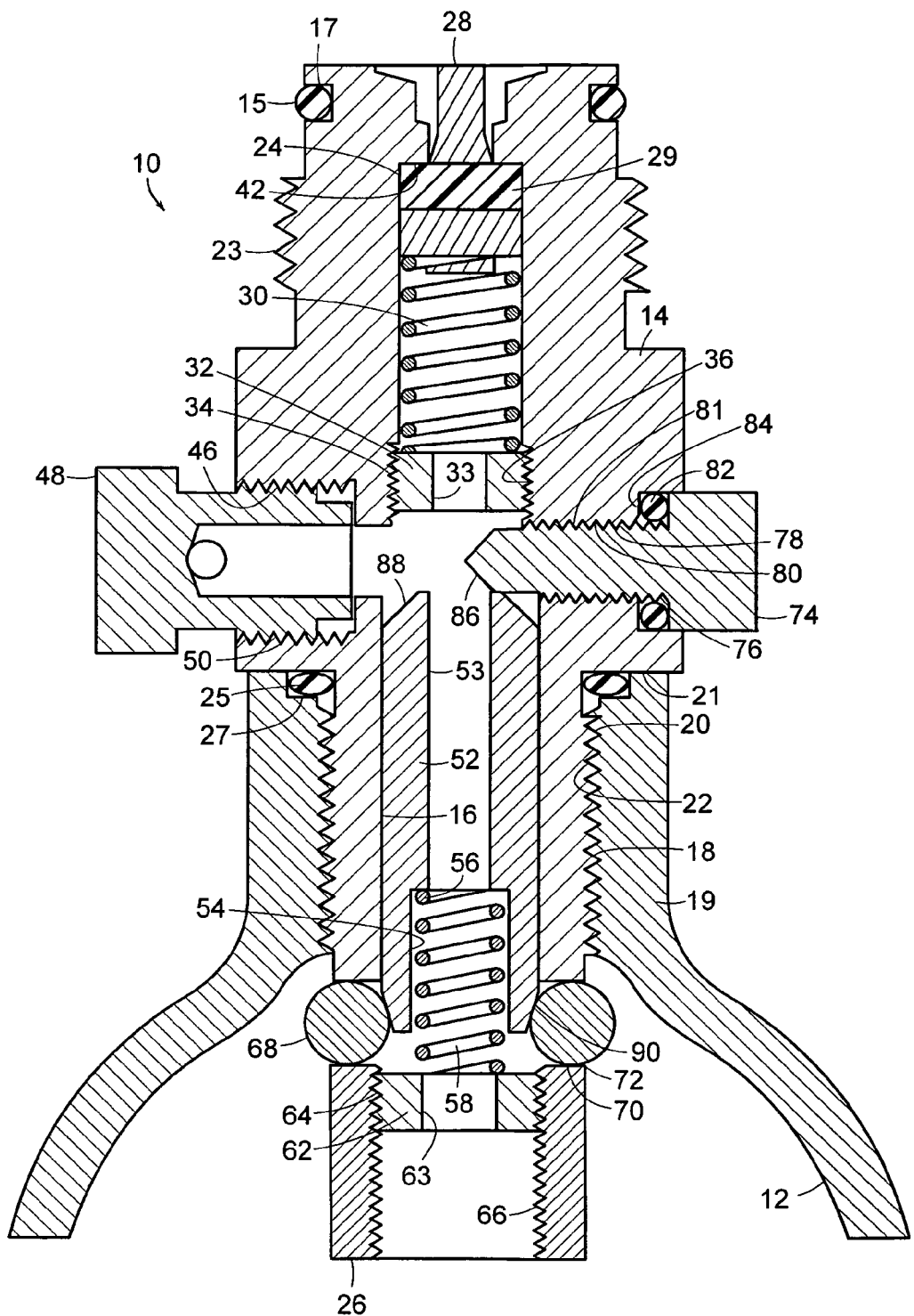
FIG. 1 is a section view of a valve in accordance with a preferred embodiment of the present invention, shown installed on a canister in a first closed condition.

The figures referred to above are not drawn necessarily to scale and should be understood to provide a representation of the invention, illustrative of the principles involved. Some features of the valve for a pressurized canister depicted in the drawings have been enlarged or distorted relative to others to facilitate explanation and understanding. The same reference numbers are used in the drawings for similar or identical components and features shown in various alternative embodiments. Valves for pressurized canisters as disclosed herein would have configurations and components determined, in part, by the intended application and environment in which they are used.

DETAILED DESCRIPTION OF CERTAIN PREFERRED EMBODIMENTS

The present invention may be embodied in various forms. The embodiments described herein are directed to a valve for use with a pressurized canister. One such pressurized canister is one that is secured to a regulator for a paintball gun. It is to be appreciated that other applications of the valve described herein are considered to be within the scope of the present invention, and other such applications will become readily apparent to those skilled in the art, given the benefit of this disclosure.

A preferred embodiment of a valve 10 for a pressurized canister 12 is shown in FIG. 1. Canister 12 contains a pressurized fluid, such as $CO_2$. Valve 10 includes a substantially cylindrical housing 14 having a central aperture 16 extending therethrough. A first set of external threads 18 are provided on an axially inner portion of the exterior surface of housing 14. A neck 19 of canister 12 has an aperture 20 formed therein, which includes internal threads 22. A shoulder 21 formed on housing abuts the radially outward edge of neck 19. A seal such as an O-ring 25 is positioned in a recess 27 formed at the axially outward end of aperture 20 ensuring a good seal between valve 10 and canister 12.

Threads 18 of housing 14 mate with threads 22 of canister 12 to secure valve 10 to canister 12. In a preferred embodiment, a thread locking sealant is applied to threads 22 and threads 18.

Unless otherwise stated, or otherwise clear from the context below, directional terms used herein, such as rearwardly, forwardly, inwardly, downwardly, upwardly, etc., refer to directions relative to valve 10 and canister 12 to which it is attached. In the embodiment illustrated in FIGS. 1–2, valve 10 and canister 12 are disposed substantially vertically. However, it is to be appreciated that valve 10 and canister 12 can be in any orientation. As seen here, radially outwardly with respect to valve 10 refers to a direction extending away from central aperture 16, which is seen to be horizontal in this embodiment, that is, to the left or right as seen in FIGS. 1–2. Axially outwardly refers to a direction extending away from the interior of canister 12, that is, upwardly toward the top of the page as seen in FIGS. 1–2. Naturally, axially inwardly refers to a direction extending toward the interior of canister 12, that is, toward the bottom of the page as seen in FIGS. 1–2.

A second set of external threads 23 are provided on a radially outward portion of housing 14. External threads 23 mate with corresponding internal threads (not shown) on a device to which valve 10 and canister 12 are attached, such as an adapter (e.g., an ASA adapter), which itself may be attached to a regulator, for a paintball gun. A seal such as O-ring 15 is positioned in an annular recess 17 formed in an exterior surface of housing 14 proximate its axially outward end, providing a seal between valve 10 and the device to which it is attached.

Central aperture 16 has a first end 24 open to the surrounding environment, or to a device to which valve 10 is attached, and a second end 26 that is open to an interior of canister 12. A sealing member such as a pin 28 with a seal 29 is slidingly received in first end 24 of central aperture 16. Seal 29 may be formed of any flexible material, such as urethane, that will provide a resilient seal between pin 28 and housing 14. A biasing member such as spring 30 is positioned between pin 28 and a spring stop 32, which has an aperture 33 extending therethrough and is secured to central aperture 16. In a preferred embodiment, external threads 34 on spring stop 32 engage a first set of internal threads 36 on central aperture 16. In a preferred embodiment, spring stop 32 may be a nut having external threads.

A shoulder 42 formed at first end 24 of central aperture 16 engages seal 29 of pin 28 to retain pin 28 within central aperture 16 and seal central aperture 16. Spring 30 acts to bias pin 28 and seal 29 outwardly into engagement with shoulder 42, providing a seal for valve 10. To open valve 10, pin 28 is pressed inwardly into central aperture 16 against the pressure of spring 30, providing a path between the interior of canister 12 and the environment. When canister 12 is pressurized and pin 28 is depressed, pressurized fluid flows out of valve 10 through central aperture 16. Pin 28 is typically depressed by an adapter (not shown) of a device to be operated, such as a paintball gun. Spring 30 may be a coil spring, as illustrated here, or any other suitable biasing member.

Housing 14 includes a threaded radial aperture 46, to which a pressure relief valve 48 having external threads 50 is secured. In the illustrated embodiment, pressure relief valve 48 is a rupture valve 48 having a rupture disk (not shown). Rupture valve 48 works in known fashion to relieve pressure from canister 12 in the event that the pressure within canister 12 exceeds a predetermined level.

An axially slidable member 52 is positioned in central aperture 16 axially inwardly of spring stop 32. In a preferred embodiment, the axially slidable member 52 is a cylindrical sleeve 52 having a central aperture 53 extending therethrough. It is to be appreciated that axially slidable member 52 may have any shape that is movable within central aperture 16 and will provide a fluid passage through central aperture 16. Thus, for example, a member that is square in cross-section would be suitable for axially slidable member 52 since fluid would be free to flow between its sides and the surface of central aperture 16. Other suitable shapes for axially slidable member 52 will become readily apparent to those skilled in the art, given the benefit of this disclosure.

A recess 54 formed on the interior surface of an axially inner end 55 of sleeve 52 engages a first end 56 of a biasing member such as a spring 58. Spring 58 may be a coil spring, as illustrated here, or any other suitable biasing member. A second end 60 of spring 58 engages a spring stop 62, which has an aperture 63 extending therethrough and external threads 64, which is secured to central aperture 16 by way of engagement of threads 64 with a second set of internal threads 66 formed on central aperture 16. In a preferred embodiment, the diameter of central aperture 16 at its axially inward end where internal threads 66 are formed is a larger than its diameter at its axially outward end, which allows spring stop 32 to easily be inserted into central aperture 16. Spring 58 acts to bias sleeve 52 axially away from canister 12. In a preferred embodiment, spring stop 62 may be a nut having external threads.

A plurality of radially moveable members such as balls 68 are positioned in corresponding apertures 70 formed in housing 14 proximate second end 26. Balls 68 are free to move radially with respect to housing 14 in apertures 70, however, a lip 72 is formed about the periphery of apertures 70 on the exterior surface of housing 14. Lip 72 prevents balls 68 from passing entirely outward through housing 14 into canister 12.

A threaded member such as a screw 74 has external threads 76 that mate with internal threads 78 formed in a radial aperture 80 in housing 14 such that screw 74 extends radially central aperture 16 of housing 14. It is to be appreciated that the threaded member may be a bolt or any other suitable threaded element. Screw 74 has a flat 81 formed on threads 76, which allows fluid to pass by screw 74 when it is unthreaded as shown in FIG. 2. In a preferred embodiment, flat 81 extends along the length of threads 76 and around approximately 30° of the circumference of screw 74.

A resilient seal, such as an O-ring 82 is captured between a head of screw 74 and a shoulder 84 of aperture 80 to provide a seal between screw 74 and housing 14. As screw 74 is tightened, it extends through aperture 80 and into central aperture 16. A tip 86 of screw 74 engages an axially outer end 88 of sleeve 52. In a preferred embodiment, tip 86 of screw 74 and axially outer end 88 of sleeve 52 are beveled. Tip 86 and outer end 88 are preferably beveled approximately 45°. In certain embodiments, screw 74 may be a safety screw to reduce the chance of it being inadvertently removed. Screw 74 may have an Allen head, a Phillips head, a slot head, a Torx head, or any other desirable type of head.

As screw 74 is tightened, tip 86 moves radially inwardly and engages outer end 88. Sleeve 52 is then driven axially inwardly within central aperture 16 against the force of spring 58. As sleeve 52 moves axially inwardly, the exterior surface 90 of inner end 55 of sleeve 52 engages and pushes balls 68 radially outwardly to a first position where they are engaged by lips 72. In a preferred embodiment, exterior surface 90 is tapered to facilitate engagement of sleeve 52 with balls 68. As seen in FIG. 1, when balls 68 are in the first, or engaged position, they protrude radially outwardly beyond the exterior surface of housing 14 so that valve 10 cannot be removed from canister 12. If valve 10 were to be unthreaded from canister 12, balls 68 would engage neck 19, preventing valve 10 from further axial movement and preventing inadvertent separation of valve 10 from canister 12. As long as screw 74 is in its tightened position, balls 68 will prevent separation of valve 10 from canister 12.

When screw 74 is loosened, it moves radially outwardly until a point where tip 86 of screw 74 is no longer in contact with outer end 88 of sleeve 52, allowing spring 58 to force sleeve 52 axially outwardly. Balls 68 are then free to move radially inwardly into a second non-engaged position, as seen in FIG. 2, where they can engage spring 58. Thus, it can be seen that balls 68 move between a radially outward first position where they engage lips 72 to a radially inward second position where they engage spring 58.

As seen in FIG. 2, where screw 74 has been loosened sufficiently to allow balls 68 to move radially inwardly, valve 10 can be removed from canister 12. Additionally, it is to be appreciated that when screw 74 is in a loosened condition, pressure cannot be maintained in canister 12, as it will leak out through aperture 80 past screw 74.

It is to be appreciated that the radially moveable members 68 need not necessarily be balls, and may have any suitable shape. Thus, for example, they could be cylindrical pins or rods that move within apertures 70. Other suitable shapes for radially moveable members 68 will become readily apparent to those skilled in the art, given the benefit of this disclosure.

Additionally, as noted above, axially moveable member 52 need not be a sleeve as illustrated here. Rather, it can have any shape that is suitable for engagement by screw 74 and balls 68, and that will provide a fluid passage through neck 19 of canister 12.

Another preferred embodiment of a pressure relief valve 92 for insertion in threaded aperture 46 is shown in FIG. 3. Valve 92 has external threads 94 that mate with threaded aperture 46. Valve 92 has an aperture 96 in fluid communication with the exterior of valve 92 by way of a second aperture 98. A spring 100 biases a ball 102 into engagement with a shoulder 104 formed at the opening of aperture 96. The spring force of spring 100 is sized such that when the pressure in central aperture 16 exceeds a designed set point, it will overcome the biasing force of spring 100, allowing ball 102 to compress the spring and allow the fluid in canister 12 to escape through apertures 96 and 98. Other suitable types of pressure relief valves will become readily apparent to those skilled in the art, given the benefit of this disclosure.

The components of valve 10 may be formed of any suitable materials including, for example, stainless steel or brass. Other suitable materials will become readily apparent to those skilled in the art, given the benefit of this disclosure.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A valve for a pressurized canister comprising, in combination:
   a housing having a central aperture extending therethrough, a first set of external threads, and a second set of external threads positioned radially inwardly of the first set of external threads;
   a sealing member positioned in an axially outward end of the central aperture and axially moveable with respect to the housing to seal and unseal the central aperture;
   a first spring biasing the sealing member axially outwardly;
   an axially slidable member received in the central aperture and providing a fluid passage therethrough;
   a second spring resiliently biasing the axially slidable member axially outwardly;
   a threaded member threadingly engaging a radial aperture in the housing, a radially inner end of the threaded member engageable with an axially outer end of the axially slidable member; and a plurality of radially moveable members, each radially moveable member positioned in a corresponding aperture formed in the housing, a lip formed on an exterior of the housing about each corresponding aperture, each radially moveable member moveable between the lip and the second spring;

wherein an exterior surface of an axially inner end of the axially slidable member engages and forces each radially moveable member radially outward into contact with the lip when the threaded member is in a tightened position.

2. The valve of claim 1, wherein the threaded member includes a flat on its threads about a portion of its circumference.

3. The valve of claim 1, wherein the threaded member is a screw.

4. The valve of claim 1, further comprising a pressure relief valve secured in an aperture formed in the housing.

5. The valve of claim 4, wherein the pressure relief valve is a rupture valve.

6. The valve of claim 4, wherein the pressure relief valve includes an aperture in fluid communication with an exterior of the valve, and a spring positioned in the aperture and biasing a ball into engagement with a shoulder formed on a radially inward end of the aperture.

7. The valve of claim 1, wherein an exterior surface of the axially inner end of the axially slidable member is tapered.

8. The valve of claim 1, wherein two radially moveable members are positioned in the apertures in the housing.

9. The valve of claim 1, wherein the radially inner end of the threaded member and an axially outer end of the axially slidable member are beveled.

10. The valve of claim 1, wherein the radially inner end of the threaded member and an axially outer end of the axially slidable member are beveled approximately 45°.

11. The valve of claim 1, further comprising a seal positioned between the threaded member and a shoulder of the aperture in which it is positioned.

12. The valve of claim 11, wherein the seal is an O-ring.

13. The valve of claim 1, wherein the housing is substantially cylindrical.

14. The valve of claim 1, further comprising a first spring stop secured to the central aperture axially inwardly of the first spring and having a central aperture extending therethrough, the first spring captured between the sealing member and the first spring stop.

15. The valve of claim 1, further comprising a second spring stop secured to the central aperture axially inwardly of the second spring and having a central aperture extending therethrough, the second spring captured between the axially slidable member and the second spring stop.

16. The valve of claim 1, wherein the sealing member comprises a pin and a seal.

17. The valve of claim 1, further comprising an O-ring positioned in an annular recess formed in an exterior surface of an axially outer end of the housing.

18. A valve for a pressurized canister comprising, in combination:

a substantially cylindrical housing having a central aperture extending therethrough, a first set of external threads, and a second set of external threads positioned radially inwardly of the first set of external threads;

a pin axially positioned in an axially outward end of the central aperture and axially moveable to seal and unseal the central aperture;

a first spring biasing the pin axially outwardly;

a axially slidable member received in the central aperture and providing a fluid passage therethrough;

a second spring resiliently biasing the axially slidable member axially outwardly;

a threaded member threadingly engaging a radial aperture in the housing, a radially inner end of the threaded member being beveled and engageable with an axially outer beveled end of the axially slidable member; and a plurality of radially moveable members, each radially moveable member positioned in a corresponding aperture formed in the housing, a lip formed on an exterior of the housing about each corresponding aperture;

wherein an exterior surface of an axially inner end of the axially slidable member is engageable with the radially moveable members to move the radially moveable members between a first radially outward position in which they are in contact with the lips and a second radially inward position in which they are in contact with the second spring.

19. The valve of claim 18, further comprising a pressure relief valve secured in an aperture formed in the housing.

20. The valve of claim 18, wherein an exterior surface of the axially inner end of the axially slidable member is tapered.

21. The valve of claim 18, wherein two radially moveable members are positioned in the apertures in the housing.

22. The valve of claim 18, further comprising an O-ring positioned between the threaded member and a shoulder of the aperture in which it is positioned.

23. A valve assembly for a pressurized canister comprising, in combination:

a substantially cylindrical housing having a central aperture extending therethrough, a first set of external threads, and a second set of external threads positioned radially inwardly of the first set of external threads;

a pin having a seal and positioned in an axially outward end of the central aperture, the pin engageable with a shoulder formed at the end of the central aperture and axially moveable to seal and unseal the central aperture;

a first spring biasing the pin axially outwardly toward the shoulder of the central aperture;

a pressure relief valve positioned in an aperture formed in the housing;

a sleeve received in and axially movable with respect to the central aperture;

a second spring resiliently biasing the sleeve axially outwardly;

a screw threadingly engaging a radial aperture in the housing, a radially inner end of the screw being beveled and engageable with an axially outer beveled end of the sleeve, the screw having a flat on its threads about a portion of its circumference;

an O-ring providing a seal between a head of the screw and the housing; and a plurality of balls, each ball positioned in a corresponding aperture formed in the housing, a lip formed on an exterior of the housing about each of corresponding aperture;

wherein an exterior surface of an axially inner end of the sleeve is engageable with the balls to move the balls between a first radially outward position in which they are in contact with the lips and a second position radially inward position in which they are in contact with the second spring.

24. The valve assembly of claim 23, wherein the radially inner end of the threaded member and the axially outer end of the axially slidable member are beveled.

25. The valve assembly of claim 23, further comprising a canister having a neck including a threaded central aperture threadingly engaged by the second set of external threads of the housing.

* * * * *